United States Patent Office 3,781,375
Patented Dec. 25, 1973

3,781,375
PROCESS FOR PREPARATION OF 1,5-DIMETHYL NAPHTHALENE AND/OR 1,6-DIMETHYL NAPHTHALENE AND CATALYST COMPOSITION TO BE USED FOR SAID PROCESS
Takeo Shima, Takanori Urasaki, Isau Oka, and Wataru Funakoshi, Iwakuni, Japan, assignors to Teijin Limited, Osaka, Japan
No Drawing. Filed Dec. 21, 1971, Ser. No. 210,615
Claims priority, application Japan, Dec. 26, 1970, 45/129,786; Sept. 29, 1971, 46/76,193
Int. Cl. C07c 15/24
U.S. Cl. 260—668 D                           16 Claims

ABSTRACT OF THE DISCLOSURE

In the process for preparing 1,5-dimethyl naphthalene and/or 1,6-dimethyl naphthalene by catalytically dehydrogenating 1,5-dimethyl tetralin and/or 1,6-dimethyl tetralin at 300–450° C. in the gas phase in the presence of a dehydrogenation catalyst, an improvement wherein the gas phase catalytic dehydrogenation is carried out in the presence of a catalytic amount of a chromia-alumina catalyst.

---

This invention relates to an improvement in the process for preparing 1,5-dimethyl naphthalene and/or 1,6-dimethyl naphthalene by the gas phase catalytic dehydrogenation of 1,5-dimethyl tetralin and/or 1,6-dimethyl tetralin.

More specifically, this invention relates to an improved process according to which 1,5-dimethyl naphthalene and/or 1,6-dimethyl naphthalene can be prepared from 1,5-dimethyl tetralin and/or 1,6-dimethyl tetralin at much improved conversion and selectivity with very excellent catalyst life over heretofore proposed processes.

It has been known in the art that when 1,5-dimethyl tetralin and/or 1,6-dimethyl tetralin is subjected to catalytic dehydrogenation in the gas or liquid phase, 1,5-dimethyl naphthalene and/or 1,6-dimethyl naphthalene can be obtained. For instance, the Journal of Organic Chemistry, 30, 82 (1964) discloses the liquid phase catalytic dehydrogenation with use of a catalyst composed of palladium supported on carbon. A gas phase catalytic dehydrogenation with use of a catalyst composed of platinum on alumina has also been known (U.S. Pat. No. 3,244,758 specification).

In general, the gas phase catalytic dehydrogenation is more advantageous than the liquid phase catalytic dehydrogenation in the point that the yield of the product per unit amount of the catalyst is greater and the operation is performed more easily with use of simple equipment.

This invention is directed to an improvement of the process of preparing 1,5-dimethyl naphthalene and/or 1,6-dimethyl naphthalene by gas phase catalytic dehydrogenation.

1,5-dimethyl naphthalene and 1,6-dimethyl naphthalene are useful intermediates which can be isomerized to 2,6-dimethyl naphthalene which can be converted to 2,6-naphthalene dicarboxylic acid, and is valuable starting material for the preparation of polyesters. Thus, development of a process which makes it possible to manufacture these intermediates at high conversion and selectivity on an industrial scale has been desired in the art.

In U.S. Pat. No. 3,244,758 it is disclosed that the dehydrogenation reaction is carried out at 300–450° C., preferably 370–425° C., under a pressure of 150–300 p.s.i.g. by employing a catalyst composed of non-acidic platinum supported on alumina. This process is disadvantageous in that the catalyst is expensive and the regeneration of the catalyst must be conducted by the troublesome two steps of removing carbonaceous materials deposited on the carrier by heating it in an oxygen-containing gas stream and heating the so treated catalyst in a hydrogen gas stream to effect reduction. Moreover, as is illustrated in comparative examples given hereinbelow, the catalyst proposed in such patent gives only very low conversion and selectivity with an extremely short life of the catalyst. Especially when the process is conducted continuously, the catalyst fails to maintain a practical activity, and when the reaction is carried out in the absence of hydrogen, the activity of the catalyst is extremely lowered in a very short time. Still further, the catalyst tends to cause a decomposition reaction consisting mainly of demethylation.

Research has now been conducted with a view to developing a process for the preparation of 1,5-dimethyl naphthalene and/or 1,6-dimethyl naphthalene by the gas phase catalytic dehydrogenation of 1,5-dimethyl tetralin and/or 1,6-dimethyl tetralin according to which the above advantages of the gas phase catalytic reaction can be further increased and the above defects of the gas phase reaction can be overcome, and it has now been found that $Cr_2O_3$-$Al_2O_3$ catalysts which have heretofore been used at temperatures of at least 500° C., for instance, at about 600° C. in the catalytic dehydrogenation of butene and at 500–600° C. in the catalytic dehydrogenation of methyl decahydronaphthalene, exhibit a prominently excellent activity in the intended catalytic dehydrogenation under milder temperature conditions, namely 300–450° C., with a very long catalyst life. It has been confirmed that the $Cr_2O_3$-$Al_2O_3$ catalysts are much superior to the catalysts proposed in U.S. Pat. No. 3,244,758 with respect to catalytic activity and catalyst life.

It has also been found that when the above $Cr_2O_3$-$Al_2O_3$ catalysts are used, it is unnecessary to provide hydrogen in the reaction system and the regeneration of the catalysts can be accomplished more advantageously over said known catalysts, because they can be readily regenerated by a one step regeneration of heating them in an oxygen-containing gas stream to thereby remove carbonaceous materials deposited thereon, providing regenerated catalysts which exhibit a prominently excellent activity again. Further, these catalysts are advantageous in that they do not contain any expensive noble metal component.

Accordingly, it is an object of this invention to provide a highly improved industrial process for preparing 1,5-dimethyl naphthalene and/or 1,6-dimethyl naphthalene selectively from 1,5-dimethyl tetralin and/or 1,6-dimethyl tetralin by gas phase catalytic dehydrogenation Another object of this invention is to provide a catalyst composition for the dehydrogenation of 1,5-dimethyl tetralin and/or 1,6-dimethyl tetralin which is used in such improved process.

Other objects and advantages of this invention will be apparent from the description given hereinbelow.

Chromia-alumina catalysts to be used in this invention have been known. They may be synthesized by various methods and are commercially available. For instance, the specification of U.S. Pat. No. 2,402,854 (Ind. Eng. Chem. 37, 366 (1945)) teaches a method comprising dipping alumina in a chromic acid solution, followed by drying and calcination. The specification of U.S. Pat. No. 2,888,497 discloses a method which involves agitating a mixture of alumina and granular chromium oxide at 200–374° F. In addition, the methods disclosed in Ind. Eng. Chem., 41, 563 (1949); Ind. Eng. Chem., 43, 1685 (1951); and Ind. Eng. Chem., 46, 1541 (1954) may be mentioned.

In the chromia-alumina catalyst to be used in the process of this invention, the chromia content is within a range of from about 2 to about 60% by weight, preferably about 5 to about 45% by weight, especially preferably about 7 to about 40% by weight, because too low a chromia content is likely to reduce the activity of the catalyst and because too high a chromia content tends to reduce the strength or activity of the catalyst.

It is possible and preferable for the chromia-alumina catalyst to include magnesium oxide in an amount sufficient to exhibit an additional activity as an assistant. In order to attain a satisfactory improvement in the catalyst life and activity, it is sufficient that magnesium oxide is contained in an amount of up to about 25% by weight. Generally, magnesium oxide is frequently used in an amount of about 0.1 to about 20% by weight, preferable amounts being in the range of from about 0.5 to about 10% by weight.

Further, the chromia-alumina catalyst to be used in the process of this invention may contain a catalytic amount of a metallic component selected from the group consisting of Li, Na, K, Be, Ca, Sr, Ba, Zn, Cd, Ce, Mn, B and Cu. Generally, it is sufficient that one or more of these metallic components (in the form of oxides) are incorporated in amounts not exceeding about 5% by weight calculated as oxides. For instance, they are used in amounts of about 0.01 to about 5% by weight, preferably about 0.05 to about 3% by weight, calculated as oxides.

The incorporation of these assistant components may be accomplished by, for instance, a method comprising impregnating chromia-alumina with a water-soluble compound of the metallic component which will remove its acid radical in the process of regeneration, such as nitrates, carbonates or acetates, and thereafter drying, calcining and reducing the so impregnated chromia-alumina. It is possible to incorporate these metallic components into the chromia-alumina catalyst by a method comprising mixing chromia-alumina with such compound or oxide of the metallic component, contacting them intimately by mechanical means such as kneading and pulverization, and thereafter calcining the blend, optionally followed by reduction. When the chromia-alumina catalyst is prepared by the coprecipitation method, it is possible to coprecipitate these assistant components simultaneously to obtain an assistant-incorporated chromia-alumina catalyst.

It is especially preferred that the starting material to be dehydrogenated in the process of this invention contains 1,5-dimethyl tetralin and/or 1,6-dimethyl tetralin at an isomer concentration of 1,5- and/or 1,6-form exceeding 90% by weight. In other words, it is not preferred to use as the starting material a dimethyl tetralin isomer mixture containing 1,7-dimethyl tetralin, 1,3-dimethyl tetralin and isomers other than 1,5-dimethyl tetralin and 1,6-dimethyl tetralin at a concentration exceeding 10% by weight, because such mixture is not converted to an intermediate suitable for the preparation of 2,6-naphthalene dicarboxylic acid.

It is possible to prepare 1,5-dimethyl tetralin alone or together with 1,6 - dimethyl tetralin from 5 - (o - tolyl) pentene-2 by the gas phase catalytic method employing a solid acid as a catalyst. In this case, 5-(o-tolyl)pentane-3 and 5-(o-tolyl)pentene-4 are formed as by-products. It is not preferred to use as the starting material a mixture from the above reaction if it contains substantial amounts of such by-products, because the presence of substantial amounts of such by-products badly influences the activity of the catalyst to be used in the process of this invention. Accordingly, in case a mixture derived from 5-(o-tolyl) pentene-2 by the above reaction is used as the starting material, it is preferred to reduce the content of such by-products to less than about 5% by weight, preferably less than about 3% by weight, especially preferably less than about 2% by weight, for instance, about 1.5% by weight.

In the process of this invention, the chromia-alumina catalyst which may further comprise any of the above-mentioned co-catalysts is packed in the reaction zone, and the gas phase catalytic dehydrogenation reaction is carried out in such reaction zone at a temperature of 300 to 450° C., preferably 380 to 430° C. The reaction may be carried out in the presence of hydrogen, but the presence of hydrogen is not critical in this invention. In case the reaction is carried out in the presence of hydrogen, it is preferred to maintain the pressure of the reaction system at less than 100 p.s.i.g. preferably less than 50 p.s.i.g. because the presence of excessive hydrogen tends to cause undesired decomposition reactions and other side reactions and to reduce the activity of the catalyst.

The starting 1,5-dimethyl tetraline and/or 1,6-dimethyl tetralin may be introduced in the reaction zone in the liquid state. In this case the reaction is conducted under conditions keeping the reactant in the gas state under the reaction temperatures. It is also possible to feed the starting material after it has been gasified in a gasifier.

If desired, it is possible to use a diluent in the reaction. When the continuous gas phase catalytic reaction is conducted at the highest possible temperature for the shortest possible period after initiation of the reaction, undesired side reactions such as decomposition readily occur. Accordingly, when a higher temperature such as 420° C. or more is adopted in the initiation stage of the continuous reaction, in order to avoid occurrence of side reactions, it is preferred to employ a diluent. Any of the diluents which are inert under the reaction conditions may be employed for the above purpose. As such diluents inert gases such as nitrogen gas and hydrocarbons such as benzene, toluene and n-hexane may be exemplified.

When the process of this invention is conducted continuously, it is prefererd to adopt a relatively low temperature within the above-mentioned temperature range, such as not exceeding 400° C., in the initiation stage and to adopt a relatively higher temperature exceeding 400° C. in the terminal stage of the reaction. For instance, a procedure may be preferably adopted in which at the initial stage of the continuous reaction the temperature is maintained within a range of from about 350 to about 400° C. and the temperature is raised gradually or stepwise above 400° C., for instance, to about 430° C., with the passage of the reaction time.

Generally, the reaction is so operated that the space velocity (the weight ratio of the reactant to the catalyst) will be maintained at about 0.05 to about 15, preferably 0.1 to 3, especially preferably 0.2 to 1.5. Since in this invention it is possible to separate the unreacted starting material from the product flow and recycle it to the reaction zone, a high velocity of about 5 may often be adopted advantageously.

The reaction may be carried out under atmospheric pressure, but is also possible to conduct the reaction under an elevated pressure. In general the reaction is carried out under a pressure ranging from atmospheric pressure to 100 p.s.i.g., preferable pressure being in the range of from atmospheric pressure to about 50 p.s.i.g.

The reaction is generally effected by passing the reactants through a reaction zone packed with the catalyst. It is possible to adopt the fixed bed method, the moving bed method or the fluidized bed method. In general the reaction is carried out by employing the fixed bed. A procedure of the multi-staged packed-bed type may be adopted where the temperatures of the stages of the bed are so arranged within the above mentioned range that the temperature of one stage is a little higher than the temperature of the preceding stage. It is also possible to adopt a method of passing the reactants through a plurality of columns in which the temperature of one column is a little lower than the temperature of the next column toward the reaction product outlet. In some cases, the temperature of these columns are maintained at the same temperature.

As is seen from the description given hereinabove, a catalyst composition especially suitable for the practice of the process of this invention is one for the dehydrogenation of 1,5-dimethyl tetralin and/or 1,6-dimethyl tertalin which comprises a chromia-alumina catalyst incorporated with up to 25% by weight of magnesium oxide and having a chromia content of 5-60% by weight, and such catalyst composition may further comprise a catalytic amount of a metallic component selected from the group consisting of Li, Na, Be, Ca, Sr, Ba, Zn, Cd, Ce, Mh, B and Cu.

In accordance with this invention, by employing the above catalyst composition suitable for the dehydrogenation of 1,5-dimethyl tetralin and/or 1,6-dimethyl tetralin and conducting the dehydrogenation reaction under the above-mentioned preferable conditions, it is possible to obtain 1,5-dimethyl naphthalene and/or 1,6-dimethyl naphthalene from 1,5-dimethyl tetralin and/or 1,6-dimethyl tetralin at a conversion exceeding 98% and a selectivity also exceeding 98%. Since the reaction product obtained by the process of this invention does not substantially contain an isomer whose isomerization to 2,6-dimethyl naphthalene is especially difficult, such as 1,7-dimethyl naphthalene, 1,8-dimethyl naphthalene or 2,7-dimethyl naphthalene, 2,6-dimethyl naphthalene obtained by isomerizing the product of the process of this invention has a very high purity, and therefore, is very valuable as the starting material for the preparation of 2,6-naphthalene dicarboxylic acid which in turn leads to valuable polyesters.

This invention will now be detailed by referring to examples and comparative examples, in each of which the analysis of the reaction product was performed by the gas-chromatographical analysis method.

EXAMPLE 1 AND COMPARATIVE EXAMPLES 1 TO 20

A quartz reaction tube having a diameter of 20 mm. and a length of 800 mm. was packed with 100 g. of a catalyst indicated in Table 1, and 1,5-dimethyl tetralin was fed to the reaction tube from the lower end thereof at a space velocity (the weight ratio of reactant to the catalyst) indicated in Table 1. The dehydrogenation was conducted at a temperature indicated in Table 1 for a period of time indicated in Table 1 to prepare 1,5-dimethyl naphthalene and 1,6-dimethyl naphthalene. Results are shown in Table 1.

TABLE 1

| | | Reaction conditions | | Results (percent) of— | | | |
| | | | | 10 hours reaction | | 100 hours reaction | |
| | Dehydrogenation catalyst used— | Space velocity | Reaction temperature (° C.) | Conversion | Selectivity | Conversion | Selectivity |
|---|---|---|---|---|---|---|---|
| Ex. 1 | 13% $Cr_2O_3$, 82% $Al_2O_3$, 5% MgO [1] | 0.4 | 400 | 99 | 99 | 98 | 99 |
| Comparative Ex. | | | | | | | |
| 1 | 2% Pt, 98% $Al_2O_3$ | 0.4 | 400 | 100 | 70 | 26 | 72 |
| 2 [2] | 2% Pt, 98% $Al_2O_3$ | 0.4 | 400 | 100 | 78 | 76 | 73 |
| 3 [2] | 2% Pt, 98% $Al_2O_3$ | 0.4 | 360 | 98 | 85 | 69 | 87 |
| 4 | 2% Pt, 98% carbon | 0.4 | 400 | 100 | 76 | 45 | 78 |
| 5 | 1% Pt, 87% $SiO_2$, 12% $Al_2O_3$ | 0.4 | 400 | 100 | 43 | 62 | 34 |
| 6 | 1% Pd, 99% $Al_2O_3$ | 0.4 | 400 | 100 | 75 | 82 | 79 |
| 7 | 1% Pd, 99% $Al_2O_3$ | 0.3 | 360 | 99 | 89 | 70 | 92 |
| 8 [2] | 1% Pd, 99% $Al_2O_3$ | 0.4 | 360 | 89 | 90 | 79 | 92 |
| 9 | 1% Re, 99% $Al_2O_3$ | 0.4 | 400 | 100 | 88 | 62 | 90 |
| 10 | 1% Re, 99% $Al_2O_3$ | 0.4 | 330 | 76 | 92 | 58 | 93 |
| 11 | 72% MgO, 18% $Fe_2O_3$, 5% CuO, 5% $K_2O$ [3] | 0.3 | 400 | 16 | 98 | 14 | 98 |
| 12 [4] | 72% MgO, 18% $Fe_2O_3$, 5% CuO, 5% $K_2O$ | 0.5 | 560 | 56 | 96 | 53 | 96 |
| 13 | 70% ZnO, 20% $Fe_2O_3$, 5% CuO, 5% $K_2O$ | 0.4 | 400 | 23 | 98 | 22 | 98 |
| 14 | 70% ZnO, 20% $Re_2O_3$, 5% CuO, 5% $K_2O$ [3] | 0.4 | 550 | 88 | 93 | 81 | 93 |
| 15 | 70% $ZrO_2$ 20% $Fe_2O_3$, 5% CuO, 5% $K_2O$ [3] | 0.4 | 480 | 79 | 87 | 74 | 87 |
| 16 | 70% CaO, 20% $Fe_2O_3$ 5% CuO, 5% $K_2O$ | 0.4 | 480 | 89 | 94 | 88 | 93 |
| 17 | 70% SiO, 20% $Fe_2O_3$, 5% CuO, 5% $K_2O$ [3] | 0.4 | 480 | 76 | 65 | 68 | 66 |
| 18 | 40% Cu, 60% Cr [5] | 0.4 | 400 | 71 | 93 | 65 | 93 |
| 19 | 10% Ni, 90% $Al_2O_3$ | 0.4 | 480 | 36 | 82 | 30 | 83 |
| 20 | 20% ZnS, 80% ZnO | 0.4 | 480 | 32 | 98 | 32 | 88 |

[1] Catalyst was prepared by coprecipitating chromium nitrate, aluminum nitrate and magnesium nitrate with potassium carbonate, drying the coprecipitate at 120° C. and calcining it at 550° C.
[2] Reaction was carried out in the presence of hydrogen under pressure of 180 p.s.i.
[3] Catalyst was prepared by the method disclosed in Ind. Eng. Chem., 41, 300 (1950).
[4] Reaction was carried out in the presence of $H_2O$-vapour at the weight ratio of $H_2O/1.5$, dimethyltetralin was 5.0.
[5] Catalyst was prepared by the method disclosed in J.A.C.S., 53, 1091 (1931).

EXAMPLES 2 TO 10 AND COMPARATIVE EXAMPLES 21 AND 22

A quartz reaction tube having a diameter of 20 mm. and a length of 800 mm. was packed with 100 g. of a catalyst indicated in Table 2, and 1,5-dimethyl tetralin was fed into the reaction tube at a space velocity indicated in Table 2. The gas phase catalytic dehydrogenation was conducted at a temperature indicated in Table 2 to prepare 1,5-dimethyl naphthalene and 1,6-dimethyl naphthalene. Results are shown in Table 2.

TABLE 2

| | | Reaction conditions | | | Time hours from initiation of reaction | Results of reaction | |
| | Dehydrogenation catalyst used— | Space velocity | Temperature (° C.) | Pressure (p.s.i.g.) | | Conversion (percent) | Selectivity (percent) |
|---|---|---|---|---|---|---|---|
| Ex. 2 | 14% $Cr_2O_3$, 84% $Al_2O_3$, 2% $Li_2O$ | 0.2 | 380 | Atmospheric pressure | 100 | 100 | 99 |
| Ex. 3 | 10% $Cr_2O_3$, 88% $Al_2O_3$, 2% $Na_2O$ | 0.5 | 420 | do | 300 | 99 | 99 |
| Comparative Ex. 21 | 10% $Cr_2O_3$, 88% $Al_2O_3$, 2% $Na_2O$ | 0.5 | 530 | do | 100 | 100 | 78 |
| Ex. 4 [1] | 10 $Cr_2O_3$, 88% $Al_2O_3$, 2% $K_2O$ | 0.5 | 400 | do | 50 | 99 | 98 |
| Ex. 5 | 10% $Cr_2O_3$, 87% $Al_2O_3$, 3% BeO | 0.3 | 410 | do | 100 | 99 | 98 |
| Ex. 6 | 10% $Cr_2O_3$, 87% $Al_2O_3$, 3% CaO | 1.5 | 420 | 50 | 50 | 97 | 98 |
| Ex. 7 | 15% $Cr_2O_3$, 82% $Al_2O_3$, 3% ZnO | 0.8 | 360 | Atmospheric pressure | 100 | 97 | 98 |
| Comparative Ex. 22 | 15% $Cr_2O_3$, 82% $Al_2O_3$, 3% ZnO | 0.8 | 280 | do | 100 | 16 | 99 |
| Ex. 8 | 10% $Cr_2O_3$, 85% $Al_2O_3$, 3% MgO, 2% $K_2O$ | 0.3 | 400 | do | 100 | 99 | 98 |
| Ex. 9 | 8% $Cr_2O_3$, 89% $Al_2O_3$, 3% $Ceo$ | 1.0 | 400 | do | 300 | 98 | 99 |
| Ex. 10 | 15% $Cr_2O_3$, 85% $Al_2O_3$ | 0.3 | 400 | 50 | 100 | 96 | 95 |

[1] Nitrogen gas was used as diluent.

EXAMPLE 11

A quartz reaction tube having a diameter of 20 mm. and a length of 800 mm. was packed with 100 g. of a chromina-alumina catalyst composed of 13% by weight of $Cr_2O_3$, 82% by weight of $Al_2O_3$ and 5% by weight of MgO, and while 1,6-dimethyl tetralin was being fed to the reaction tube at a rate of 50 g./hr., the gas phase catalytic dehydrogenation was carried out at 400° C. When the reaction was continued at this temperature for 100 hours from the initiation of the reaction, the reaction product was analyzed, and as a result it was found that the conversion was 98% and the selectivity was 99%.

EXAMPLE 12

A quartz reaction tube having a diameter of 20 mm. and a length of 800 mm. was packed with 100 g. of a chromia-alumina catalyst composed of 13% by weight of $Cr_2O_3$, 82% by weight of $Al_2O_3$ and 5% by weight of MgO, while a mixture of 90% by weight of 1,5-dimethyl tetralin and 10% by weight of 1,6-dimethyl tetralin was being fed at a rate of 50 g./hr., the gas phase catalytic dehydrogenation was carried out at 410° C. by blowing nitrogen gas at a rate of 100 ml./min. from the upper portion of the reaction tube. The reaction was continued at the above temperature for 100 hours, and it was found that after 100 hours of reaction, the conversion was 98% and the selectivity was 99%.

EXAMPLE 13

Fifty (50) kilograms of a MgO-carrying chromia-alumina catalyst composed of 13% by weight of $Cr_2O_3$, 82% by weight of $Al_2O_3$ and 5% by weight of MgO were uniformly packed into a multitubular reactor consisting of 50 stainless steel plural reaction tubes having a diameter of 50 mm. and a length of 1800 mm., and 1,5-dimethyl tetralin was passed through the reactor at a rate of 25 kg./hr. (space velocity of 0.5). The reaction was continued for 10 hours at 380° C., for 150 hours at 390° C., for 150 hours at 405° C. and then for 100 hours at 420° C. The conversion and selectivity at each temperature (average values throughout the period during which the reaction was conducted at each temperature) were determined. Results are shown in Table 3.

TABLE 3

| Temperature (° C.) | Reaction period (hours) | Average conversion (percent) | Average selectivity (percent) |
|---|---|---|---|
| 380 | 10 | 96 | 99 |
| 390 | 150 | 99 | 99 |
| 405 | 150 | 98 | 99 |
| 420 | 100 | 98 | 98 |

What we claim is:

1. In the process for preparing 1,5-dimethyl naphthalene, 1,6-dimethyl naphthalene or mixture thereof by catalytically dehydrogenating 1,5-dimethyl tetralin, 1,6-dimethyl tetralin or mixture thereof in the gas phase in the presence of a dehydrogenation catalyst, improvement wherein the gas phase catalytic dehydrogenation is carried out in the presence of a catalytic amount of a chromia-alumina catalyst at a temperature of 300–450° C.

2. The process of claim 1, wherein the chromia-alumina catalyst contains a catalytic amount of magnesium oxide.

3. The process of claim 1, wherein the chromia-alumina catalyst contains a catalytic amount of a metallic component selected from the group consisting of Li, Na, K, Be, Ca, Sr, Ba, Zn, Cd, Ce, Mn, B and Cu.

4. The process of claim 1, wherein the chromina content of the chromina-alumina catalyst is within a range of from 2 to 60% by weight.

5. The process of claim 2, wherein the magnesium oxide is contained in the catalyst in an amount of up to 25% by weight.

6. The process of claim 3, wherein the content of the metallic component (calculated as the oxide) is less than 5% by weight.

7. The process of claim 1, wherein the reaction is carried out under such conditions that the weight ratio of the reactant to the catalyst is within a range of from 0.05 to 15 per hour.

8. The process of claim 1, wherein the reaction is carried out under a pressure ranging from atmospheric pressure to 100 p.s.i.g.

9. The process of claim 4, wherein the chromia content of the chromina-alumina catalyst is within the range of from 2 to 45% by weight.

10. The process of claim 9, wherein the chromia content of the chromia-alumina catalyst is within the range of from 7 to 40% by weight.

11. The process of claim 5, wherein the magnesium oxide is present in an amount of about 0.1 to about 20% by weight.

12. The process of claim 11, wherein the magnesium oxide is present in an amount of about 0.5 to about 10% by weight.

13. The process of claim 6, wherein said metallic component is present in an amount of about 0.01 to about 5% by weight.

14. The process of claim 13, wherein said metallic component is present in an amount of about 0.05 to about 3% by weight.

15. The process of claim 7, wherein the weight ratio of the reactant to the catalyst is within the range of from 0.1 to 3.

16. The process of claim 15, wherein the weight ratio of the reactant to the catalyst is within the range of from 0.2–1.5.

References Cited

UNITED STATES PATENTS

| | | | |
|---|---|---|---|
| 2,920,115 | 1/1960 | Friedman | 260—668 D |
| 2,958,643 | 11/1960 | Friedman | 260—668 D |
| 2,586,377 | 2/1952 | Pitzer | 260—668 D |
| 2,638,455 | 5/1953 | Pitzer | 260—668 D |
| 2,754,345 | 7/1956 | Kirshenbaum | 260—668 D |
| 2,755,323 | 7/1956 | Pitzer | 260—668 D |
| 3,071,629 | 1/1963 | White et al. | 260—668 D |

CURTIS R. DAVIS, Primary Examiner

U.S. Cl. X.R.

260—668 F